United States Patent [19]

Castleberry

[11] 4,222,320
[45] Sep. 16, 1980

[54] COFFEE MAKER

[75] Inventor: Billy J. Castleberry, Lubbock, Tex.

[73] Assignee: AAA Office Coffee Service, Inc., Lubbock, Tex.

[21] Appl. No.: 955,343

[22] Filed: Oct. 27, 1978

[51] Int. Cl.³ ............................................. A47J 31/10
[52] U.S. Cl. ...................................... 99/281; 99/295; 99/307
[58] Field of Search ................. 99/280, 281, 282, 283, 99/295, 306, 304, 307, 300, 302 R; 29/401 R, 426

[56] References Cited

U.S. PATENT DOCUMENTS

| | | | |
|---|---|---|---|
| 3,368,477 | 2/1968 | Raiteri | 99/298 |
| 3,385,201 | 5/1968 | Martin | 99/282 |
| 3,470,897 | 10/1969 | Karlen | 99/282 |
| 3,589,271 | 6/1971 | Tarrant | 99/280 |
| 3,628,446 | 12/1971 | Raiteri | 99/306 |
| 3,693,535 | 9/1972 | Abel | 99/282 |
| 3,917,369 | 11/1975 | Sevee | 29/401 R |

OTHER PUBLICATIONS

Reynolds Products; Service and Parts Manual Model OCS-100; Reynolds Products, Inc., 2401 North Palmer Drive, Schaumburg, Ill. 60172.

Primary Examiner—Robert W. Jenkins
Attorney, Agent, or Firm—Wendell Coffee

[57] ABSTRACT

A coffee brewing apparatus has a hot water reservoir which sets, unconnected, on a housing above a grounds basket. The carafe rests upon a warming plate below the basket. The control unit is attached to the reservoir and the control unit is held by two screws to the housing so that the control unit and the reservoir may be readily removed as a unit from the housing for maintenance. The pouring tray is clamped to the top of the reservoir to form a vapor seal between the hot water reservoir and pouring tray. The vapor seal prevents the machines "boiling dry" by preventing vapors from escaping to condense on the apparatus.

3 Claims, 4 Drawing Figures

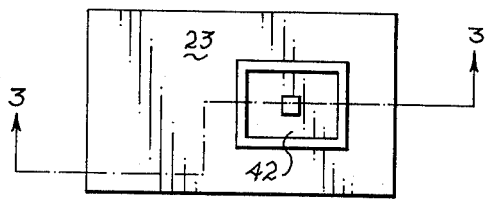
Fig. 2
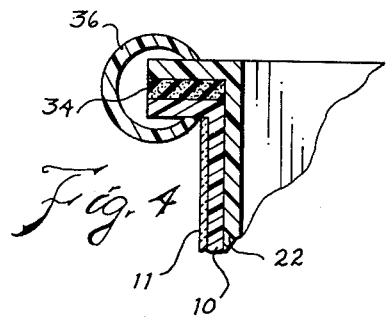
Fig. 4
Fig. 3
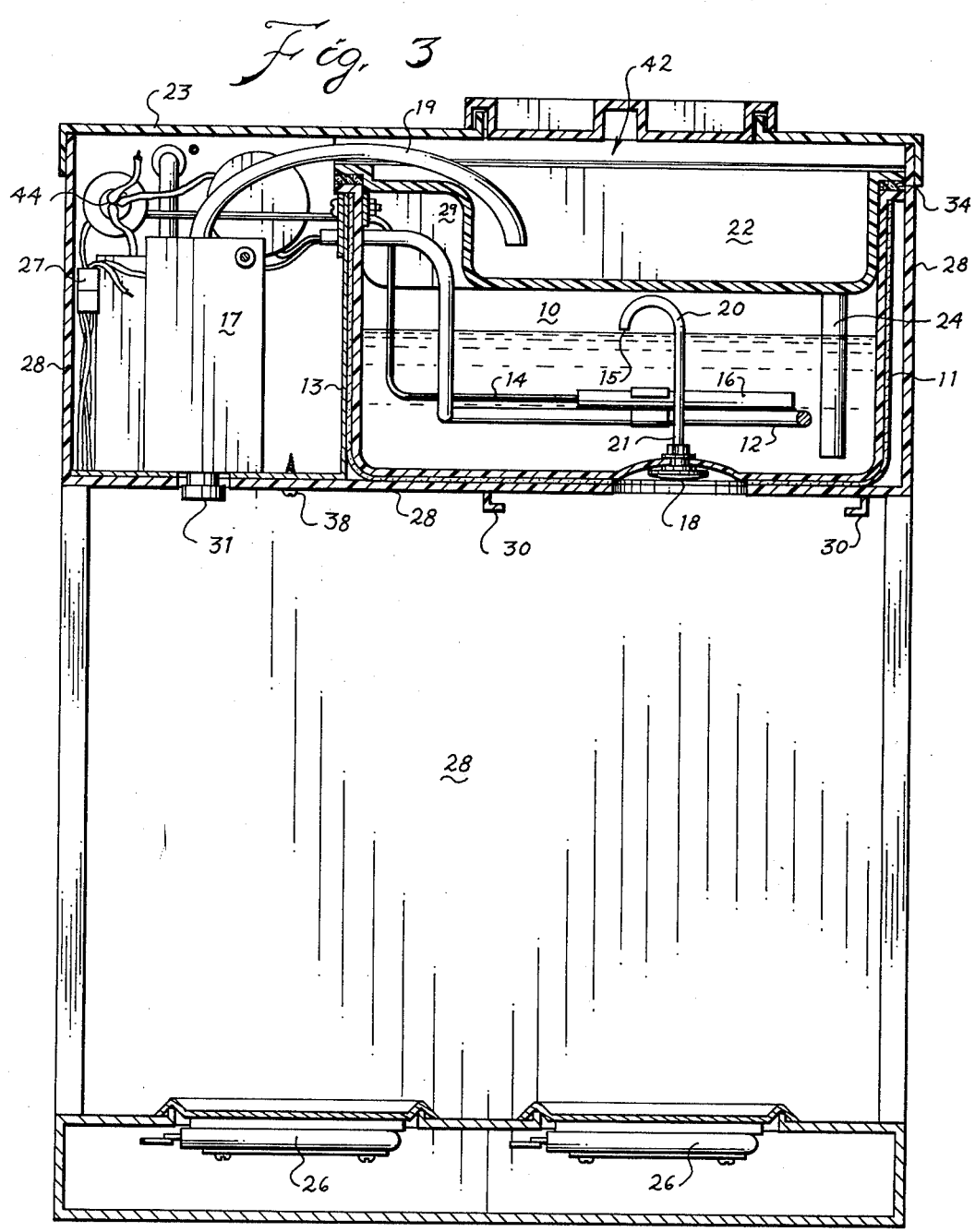

COFFEE MAKER

BACKGROUND OF THE INVENTION (1) Field of the Invention

My invention pertains to beverage preparation, more specifically pour-in, drip type coffee makers.

(2) Description of the Prior Art

Almost every office or place of business now has a coffee maker of one type or another. Increasingly, the coffee maker used is a pour-in, drip type due to their ease of operation and low cost. On the other hand, some offices and almost all food service establishments use coffee makers which are tied into the plumbing such that by depressing a button, a pre-measured charge of cold water is introduced into the coffee maker.

The workings of either type of coffee maker are substantially the same. There is a reservoir for water which is kept at about 200° F. by heating elements. Cold water is added to the reservoir by introducing the water to a pouring tray which transmits the water, by means of a funnel spout, to a level below the hot water. The hot water is then forced to a higher level. This higher level places the water over the top of a siphon tube, generally located near the middle of the reservoir. The siphon leads, by means of a spray tube, to a spray head which disperses the hot water over coffee grounds in a basket, where the coffee is brewed, filtered and ultimately introduced into a carafe.

After a coffee maker has been in use for a time, deposits begin to collect on elements in the reservoir, especially the siphon, heating element and thermocouple. Ultimately, these deposits must be cleaned, or the elements replaced if the coffee maker is to continue to function well. It is usually the case that these elements can be fairly easily cleaned if they can be reached. The location of these elements and their attachment to the housing of the coffee maker make it much harder to get to these parts than to effect their cleaning.

Before filing this application, applicant caused a search of the prior art to be made at the United States Patent and Trademark Office. That search revealed the following patents:

U.S. Pat. No. 3,220,334—Martin
U.S. Pat. No. 3,368,477—Raiteri
U.S. Pat. No. 3,459,118—Hausman
U.S. Pat. No. 3,479,949—Reynolds et al.
U.S. Pat. No. 3,589,271—Tarrant
U.S. Pat. No. 3,590,724—Lorang
U.S. Pat. No. 3,628,446—Raiteri
U.S. Pat. No. 3,793,934—Martin
U.S. Pat. No. 3,859,902—Neuman
U.S. Pat. No. 3,987,716—Lorang
U.S. Pat. No. 4,056,050—Brown
U.S. Pat. No. 4,064,795—Ackerman The problems mentioned above, keeping the elements in the hot water reservoir clean, and access to them when necessary, have been recognized by previous patentees.

LORANG, U.S. Pat. No. 3,987,716, discloses an apparatus for reducing escape of water vapor from coffee makers by providing an outlet vent and looped tube wherein water condenses ultimately to be redelivered into the reservoir.

MARTIN, U.S. Pat. No. 3,220,334, discloses a pour-in type coffee maker wherein the water discharge line opening is located at the top of a closed hot water reservoir such that when cold water is poured into a pour tray, the reservoir gets full then as water is forced through the tube, cold water goes into the reservoir.

NEUMAN ET AL. forms the siphon tube by encircling a straight tube with a larger tube formed in the bottom of a pouring tray.

TARRANT discloses a "siphon cap" into which the siphon extends.

REYNOLDS ET AL. discloses a coffee maker with a primary goal of preventing drippage between the hot water reservoir and an upper housing. The reservoir is situated beside the spray head and mineral deposits are avoided by siphoning hot water to the spray tube through a discharge outlet chamber which is larger than the tube.

Applicant believes the other patents are not as pertinent as those specifically discussed.

To the best of applicant's knowledge, a chassis assembly supporting heating elements, thermostat and other electrical components which may be removed and replaced as a unit, is unknown in the art. Neither has a siphon tube been disclosed having an inverted U-shaped top to help keep the siphon clean.

SUMMARY OF THE INVENTION (1) New and Different Function

I have invented a coffee maker which requires less maintenance than those commonly in use. My invention is also much easier to maintain and repair, when necessary, than other pour-in, drip type coffee makers. I mount the reservoir, heating coil, thermostat and control means on a chassis which is detachably connected to the support housing of the coffee maker. The reservoir, heating coil, thermostat and control means are not otherwise attached to the housing so it is possible to remove the whole assembly by extracting two screws. Having removed the faulty or dirty assembly another assembly is easily put into the housing of the coffee maker so that it is once again functional. The removed assembly may then be cleaned and repaired by a serviceman and there after used again.

The head of the siphon tube is bent into an inverted U-shape such that the level of the hot water is always below the opening of the siphoning tube. The problem of deposits flaking and the flakes becoming lodged in the siphon tube is thereby satisfactorily solved.

Therefore, it may be seen that great results are obtained. The results of the total combination is far greater than that of the sum of the individual components.

(2) Objects of this Invention

An object of this invention is to brew coffee.

A further object is to do so with a coffee maker which has components that are readily removable and repairable.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 2 is a top plan view.

FIG. 3 is a sectional view taken substantially along line 3—3 in FIG. 2.

FIG. 4 is a sectional view of the reservoir - pouring tray seal.

DESCRIPTION OF THE PREFERRED EMBODIMENT

Figure 1:
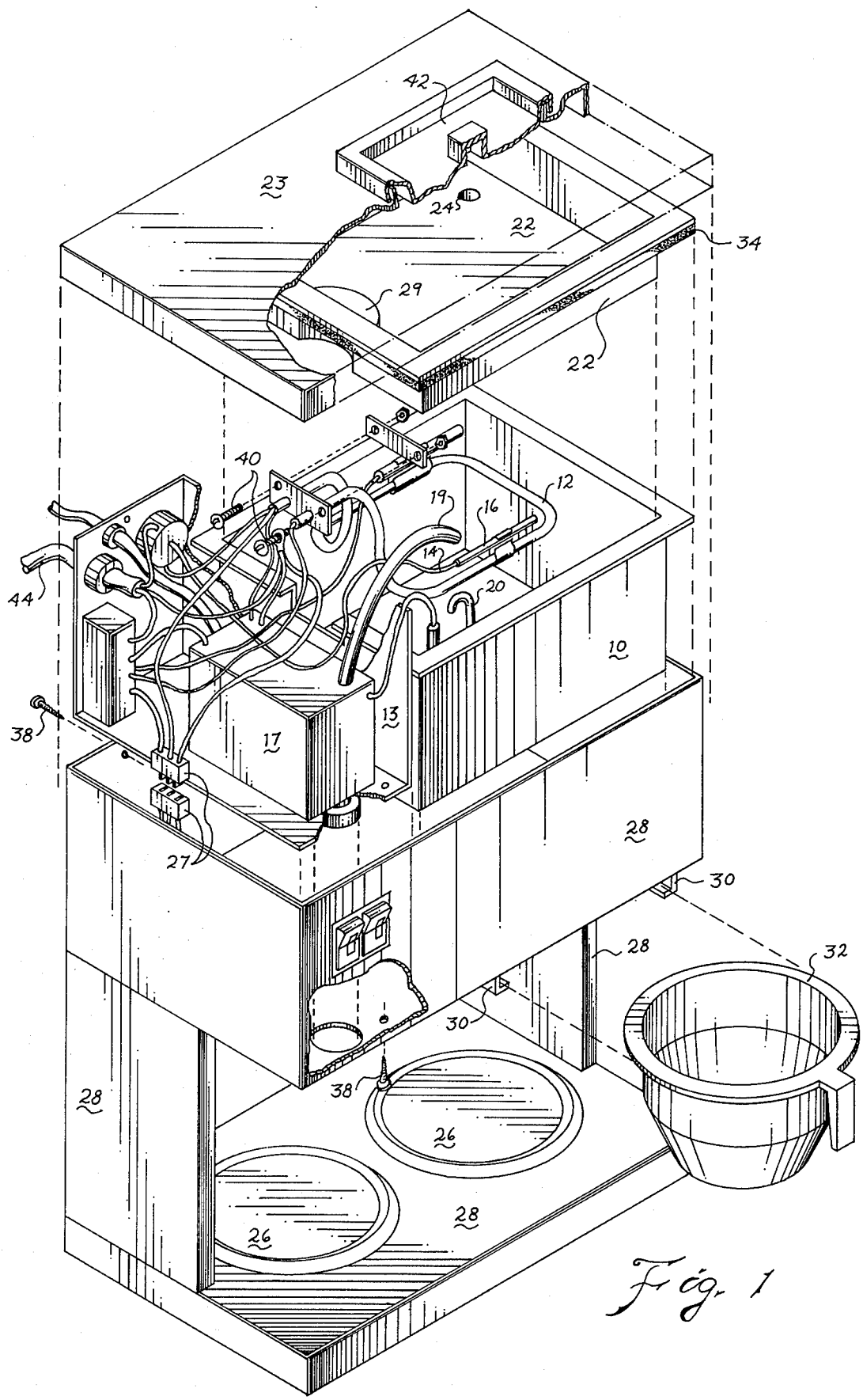
FIG. 1 is an exploded perspective view of my invention.

Referring to the drawing, it may seen that a premeasured charge of cold water may be delivered into pouring tray 22 from a source, such as tube 19. Button 31 extends out of support housing 28 through a hole out in the housing below the control means 17. The introduction of cold water by the tube 19 starts when button 31, on control means 17, is depressed. This premeasured charge is usually enough to fill a carafe (about 8 to 12 cups). If a lesser amount is desired, cold water equal to the amount desired may be poured from any convenient container into the pouring tray 22 through port 42. The cold water is then directed below the level of hot water held in reservoir 10 by funnel tube 24. This funnel tube extends from the bottom of the pouring tray 22 to near the bottom of the reservoir 10. The hot water which is held in the reservoir then rises above the siphon head 20.

The siphon head 20 and spray tube 21 are, in fact, unitary. "Siphon head" is used herein to mean the top of the spray tube including opening 15 of the spray tube below the bight of an inverted U. The tube which forms the spray head is cut horizontally making the opening 15 parallel to the water level which is parallel to the bottom of the reservoir. The opening 15 is below the bight of the inverted U and is separated from the spray tube 21 by a distance at least equal to the diameter of the spray tube 21. The spray tube is located approximately in the middle of the reservoir, below the pouring tray. The spray tube 21 extends to spray head 18 in the bottom of the reservoir.

When cold water is added to the reservoir and the water level rises above the siphon head 20, the water is siphoned into spray tube 21, thence to spray head 18. The spray head disperses the hot water over coffee in grounds basket 32. The basket 32 is held close to the spray head by means of rack 30 on housing 28. Brewed coffee drips from the basket to the carafe on warming plate 26.

As water is siphoned out and its level drops to roughly the same as the siphon head, the surface tension of the water causes a "nipple" to be formed in conjunction with the siphon head opening 15 such that once the suction is broken the level of the water in the reservoir is slightly below the siphon head. For this reson, water stored in the reservoir does not make deposits on the siphon head which would impair its function.

The water, in reservoir 10, is kept hot (about 200° F.) by heating coils 12. The reservoir is coated with insulation 11 to prevent heat loss. The amount of current sent to coils 12 is regulated by control means 17 which is in turn responsive to thermostat 16. Capillary tube 14 and thermostat 16 function to keep the control means 17 apprised of the temperature of the water in the reservoir so that that temperature can be maintained. The thermostat, heating coil and control means are all common in the art and are not a part of the invention.

Control means 17 is mounted on chasis 13 and the thermostat 16, heating coil 12, and reservoir 10 attached thereto. It will be noted that there is a jumble of wires necessary to properly connect wall power cord 44 to the heating coils 12 and 26 through plug 27. The chasis 13 is detachably connected to support housing 28 by two screws 38. The removal of these screws 38 permits the removal of the chasis, thermostat, heating coil, control means and reservoir as a unit as these elements are not otherwise attached to the support housing 28. Further, there are two reservoir screws 40 which detachably connect the reservoir 10 to chasis 13.

When it becomes necessary to service a machine according to my invention one need only: (1) unplug the coffee maker from the wall outlet and disconnect the water supply; (2) remove top 23 from the coffee maker by lifting, as it is unattached; (3) remove housing screws 38; (4) disconnect the warming plate electrical circuit by unplugging plug 27; (5) lift the chasis 13, with its jumble of wires, thermostat 16, heating coil 12, control means 17, reservoir 10, pouring tray 22, spray tube 21 and spray head 18 out of support housing 28; then (6) remove C clamps 36 to allow removal of pouring tray 22; and (7) remove the pouring tray. These steps may be performed in reverse order to install a new unit in a coffee maker. Once the chasis unit is withdrawn, it may be transported to a shop where it is cleaned and otherwise repaired. The serviced chasis unit may then be kept by the service man for use as a replacement in another coffee maker which needs maintenance.

Pouring tray 22 rests on top of reservoir 10. Both the pouring tray and the top of the reservoir are flanged. Gasket 34 is located between the flanges. The flanges of the reservoir and the pouring tray are held together by C clamps 36 on at least two sides such that water vapor does not escape. In this manner the level of hot water is kept constant through periods of non-use, as vapor will condense on the bottom of the pouring tray and be returned to the reservoir.

Indention 29 in pouring tray 22 allows the heating coils to extend from control means 17 into reservoir 10 without breaking the vapor seal.

If the unit is not to be plumbed to a water supply, the tube 19 and that part of the control means 17 are eliminated.

As an aid to correlating the terms of the claims to the exemplary drawing, the following catalog of elements is provided:

| | |
|---|---|
| 10 hot water reservoir | 24 funnel tube |
| 11 insulation | 26 warming plate |
| 12 heating coil | 27 plug |
| 13 chasis | 28 support housing |
| 14 capillary tube | 29 indention |
| 15 opening | 30 rack |
| 16 thermostat | 31 button |
| 17 control means | 32 basket |
| 18 spray head | 34 gasket |
| 19 tube | 36 C clamps |
| 20 siphon head | 38 housing screw |
| 21 spray tube | 40 reservoir screw |
| 22 pouring tray | 42 port |
| 23 top | 44 wall power cord |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a coffee making apparatus having
   a. a hot water reservoir containing
      (i) a heating coil, and
      (ii) at least one thermostat,
   b. a pouring tray setting on top the reservoir,
   c. a tube extending from the bottom of the tray to near the bottom of the reservoir,
   d. a spray head in the bottom of the reservoir,
   e. a warming plate to receive a carafe, and
   f. a housing supporting the reservoir above the warming plate;
   the improved structure comprising:
   g. a spray tube connected to the spray head,
   h. said spray tube extending up into the reservoir to
   j. an integral inverted U-shaped top thereof,
   k. the opening of the tube below the bight of the inverted U, and
   m. the opening being spaced from the remainder of the tube by a distance equal to at least the outer diameter of the tube,
   n. all parts of the spray tube being below the bottom of the pouring tray,
   o. rack means on the housing for holding a grounds basket below the spray head,
   p. control means for supplying energy to the heating coil responsive to the thermostat,
   q. an opening in the housing surrounding said spray head,
   r. a chassis with said control means attached thereto,
   s. said chassis detachably connected to said housing,
   t. said chassis detachably connected to said reservoir, and
   u. said reservoir setting unconnected on said housing.

2. The invention as defined in claim 1 further comprising:
   v. a vapor seal between the tray and reservoir, and
   w. a clamp attaching the tray to the reservoir.

3. In a coffee making apparatus having
   a. a hot water reservoir containing
      (i) a heating coil, and
      (ii) at least one thermostat,
   b. a pouring tray setting on top the reservoir,
   c. a tube extending from the bottom of the tray to near the bottom of the reservoir,
   d. a spray head in the bottom of the reservoir,
   e. a warming plate to receive a carafe,
   f. a housing supporting the reservoir above the warming plate,
   g. rack means for holding a grounds basket below the spray head, and
   h. control means for supplying energy to the heating coil responsive to the thermostat,
   the improved structure comprising:
   j. said rack means attached to said housing,
   k. an opening in the housing surrounding said spray head,
   m. a chassis with said control means attached thereto,
   n. said chassis detachably connected to said housing,
   o. said chassis detachably connected to said reservoir, and
   p. said reservoir setting unconnected on said housing.

* * * * *